(12) United States Patent
Ota

(10) Patent No.: US 11,863,235 B2
(45) Date of Patent: Jan. 2, 2024

(54) OPTICAL NETWORK SYSTEM AND AUTOMATIC OPERATION SYSTEM

(71) Applicant: SUMITOMO ELECTRIC INDUSTRIES, LTD., Osaka (JP)

(72) Inventor: Junichi Ota, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 246 days.

(21) Appl. No.: 17/615,882

(22) PCT Filed: Jun. 24, 2020

(86) PCT No.: PCT/JP2020/024830
§ 371 (c)(1),
(2) Date: Dec. 2, 2021

(87) PCT Pub. No.: WO2021/010116
PCT Pub. Date: Jan. 21, 2021

(65) Prior Publication Data
US 2022/0311516 A1      Sep. 29, 2022

(30) Foreign Application Priority Data
Jul. 16, 2019   (JP) .................. 2019-130983

(51) Int. Cl.
*H04B 10/27* (2013.01)
*H04Q 11/00* (2006.01)

(52) U.S. Cl.
CPC ......... *H04B 10/27* (2013.01); *H04Q 11/0062* (2013.01); *H04Q 2011/0064* (2013.01)

(58) Field of Classification Search
CPC ............... H04B 10/27; H04Q 11/0062; H04Q 2011/0064
See application file for complete search history.

(56) References Cited

U.S. PATENT DOCUMENTS

| | | | | |
|---|---|---|---|---|
| 5,005,937 A | * | 4/1991 | Aida ................... | H04B 10/291 398/178 |
| 5,282,257 A | | 1/1994 | Ota | |

(Continued)

FOREIGN PATENT DOCUMENTS

| | | |
|---|---|---|
| JP | H05-003457 A | 1/1993 |
| JP | H05-063723 A | 3/1993 |

(Continued)

*Primary Examiner* — Mina M Shalaby
(74) *Attorney, Agent, or Firm* — Oliff PLC

(57) ABSTRACT

An optical network system includes information processing terminals each including an optical transmitter unit and an optical receiver unit, first optical fibers, first optical transmission lines, second optical fibers, second optical transmission lines, an optical coupling unit, and an optical branching unit. The first optical fibers extend from the respective optical transmitter units of the information processing terminals. The first optical transmission lines are connected to the respective first optical fibers at one ends. The first optical fibers extend from the respective optical receiver units of the information processing terminals. The second optical transmission lines are connected to the respective second optical fibers at one ends. The optical coupling unit couples another ends of the first optical transmission lines to one end of a third optical transmission line. The optical branching unit couples another end of the third optical transmission line to another ends of the second optical transmission lines.

20 Claims, 4 Drawing Sheets

(56) References Cited

U.S. PATENT DOCUMENTS

| | | | |
|---|---|---|---|
| 5,510,920 A | 4/1996 | Ota | |
| 5,523,879 A | 6/1996 | Ota | |
| 5,570,226 A | 10/1996 | Ota | |
| 5,773,345 A | 6/1998 | Ota | |
| 6,147,786 A * | 11/2000 | Pan | H04J 14/0232 398/1 |
| 6,269,204 B1 * | 7/2001 | Ishikawa | H04J 14/0282 385/24 |
| 6,377,373 B1 * | 4/2002 | Kawazawa | H04B 10/27 398/82 |
| 2001/0017847 A1 * | 8/2001 | Hojo | H04Q 11/0062 370/480 |
| 2006/0171715 A1 | 8/2006 | Miyata et al. | |
| 2008/0002977 A1 * | 1/2008 | Mori | H04J 14/0226 398/71 |
| 2008/0285969 A1 * | 11/2008 | Kida | H04L 47/10 398/9 |
| 2009/0080881 A1 * | 3/2009 | Yokoyama | H04J 14/0241 398/16 |
| 2009/0162065 A1 * | 6/2009 | Mizutani | H04Q 11/0067 398/66 |
| 2009/0324234 A1 * | 12/2009 | Kashima | H04J 14/0282 398/92 |
| 2011/0236015 A1 * | 9/2011 | Tsujimura | H04B 10/032 398/16 |
| 2012/0093500 A1 * | 4/2012 | Shiba | H04J 14/0246 370/293 |
| 2017/0187461 A1 * | 6/2017 | Takizawa | H04J 3/1694 |
| 2020/0200986 A1 * | 6/2020 | Funada | H01R 12/72 |

FOREIGN PATENT DOCUMENTS

| | | |
|---|---|---|
| JP | H06-188515 A | 7/1994 |
| JP | H08-241495 A | 9/1996 |
| JP | 2001-028576 A | 1/2001 |
| JP | 2006-211591 A | 8/2006 |
| JP | 2008-219843 A | 9/2008 |
| JP | 2009-135681 A | 6/2009 |

* cited by examiner

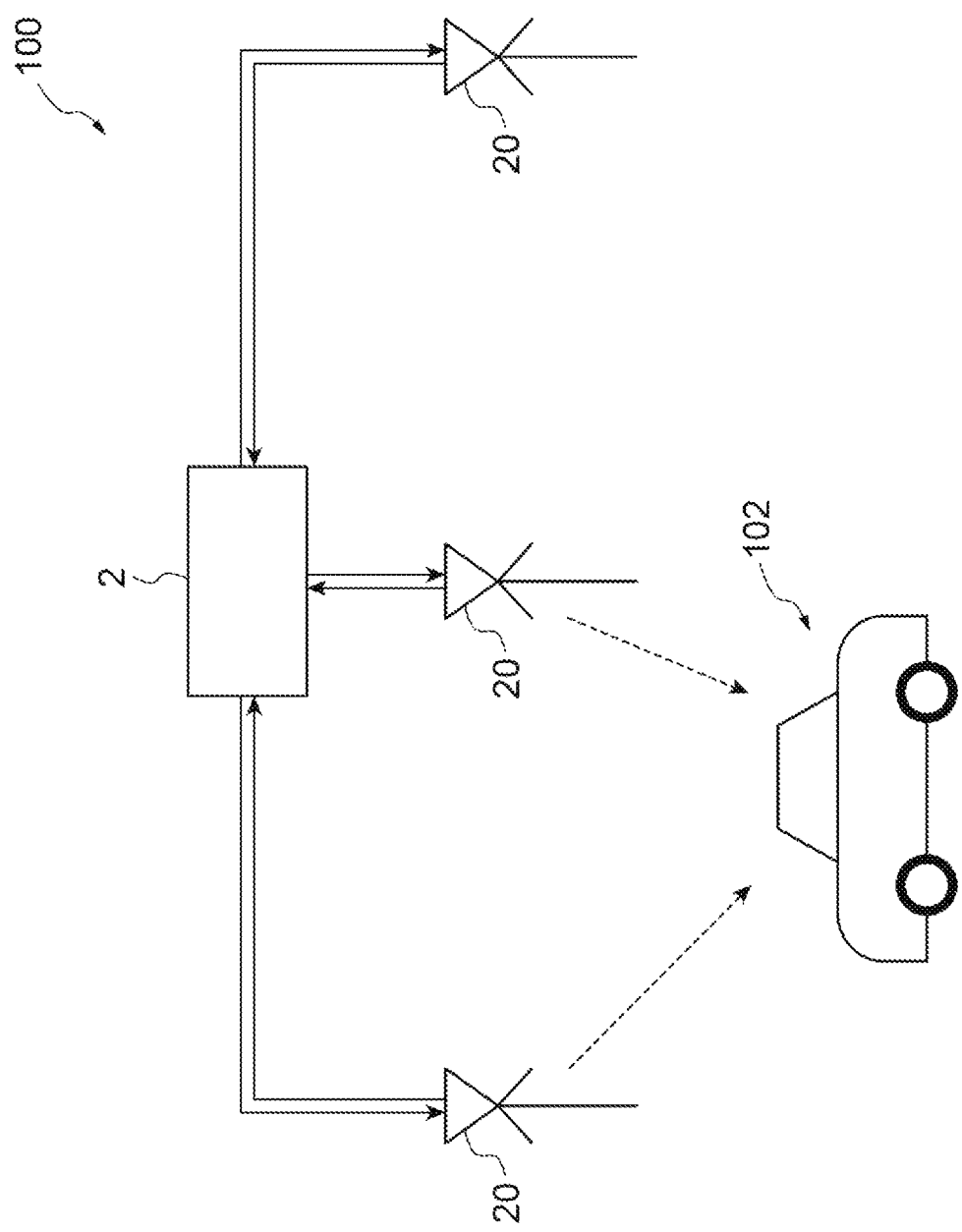

OPTICAL NETWORK SYSTEM AND AUTOMATIC OPERATION SYSTEM

TECHNICAL FIELD

The present disclosure relates to an optical network system and an autonomous driving system. This application claims the benefit of the priority based on Japanese Patent Application No. 2019-130983, filed on Jul. 16, 2019, the entire contents disclosed in the application is incorporated herein by reference.

BACKGROUND ART

Patent Literature 1 discloses a technique related to a network using an optical hub. In the network disclosed in this Patent Literature, when communication information is sent out from a terminal, an optical network interface circuit (optical NIC) creates an optical signal and sends out the created optical signal to an optical fiber. The optical fiber is connected to an optical hub, and the optical hub divides the optical signal sent from the terminal toward a plurality of other terminals and sends out the divided optical signals to optical fibers corresponding to respective terminals. Optical NICs of the plurality of other terminals receive the optical signals and restore an original electrical signal. In a case where all the other terminals receive them as signals destined for their own terminals, it is a broadcast communication in which information is sent from one terminal to the plurality of other terminals. On the other hand, in a case where one of the plurality of other terminals accepts the received signal and the other terminals discard the signal because it is not a signal destined for their own terminals, it is a one-to-one communication in which information is sent from one terminal to another terminal.

Patent Literature 2 discloses a technique related to a star coupler and an optical communication network. In the star coupler disclosed in this patent literature, three optical demultiplexers/multiplexers are connected to each other in a triangular shape, and a terminal is derived from each of the optical demultiplexers/multiplexers. Each of the optical demultiplexers/multiplexers is a branch of one waveguide into two waveguides having different widths. An input signal to one terminal is divided in half and output to the other two terminals. In addition, the input signal is not substantially returned to its own terminal.

CITATION LIST

Patent Literature

[Patent Literature 1] Japanese Unexamined Patent Publication No. 2008-219843
[Patent Literature 2] Japanese Unexamined Patent Publication No. H5-3457

SUMMARY OF INVENTION

Solution to Problem

An optical network system of the present disclosure includes N (N is an integer equal to or greater than 2) information processing terminals each including an optical transmitter unit and an optical receiver unit, N first optical fibers, N first optical transmission lines, N second optical fibers, N second optical transmission lines, an optical coupling unit, and an optical branching unit. The N first optical fibers extend from the respective optical transmitter units of the N information processing terminals. The N first optical transmission lines are connected to the respective first optical fibers at one ends. The N second optical fibers extend from the respective optical receiver units of the N information processing terminals. The N second optical transmission lines are connected to the respective second optical fibers at one ends. The optical coupling unit couples another ends of the N first optical transmission lines to one end of a third optical transmission line. The optical branching unit couples another end of the third optical transmission line to another ends of the N second optical transmission lines.

BRIEF DESCRIPTION OF DRAWINGS

FIG. 4 is a diagram schematically illustrating a configuration of an autonomous driving system as an application example.

DESCRIPTION OF EMBODIMENTS

Figure 1:
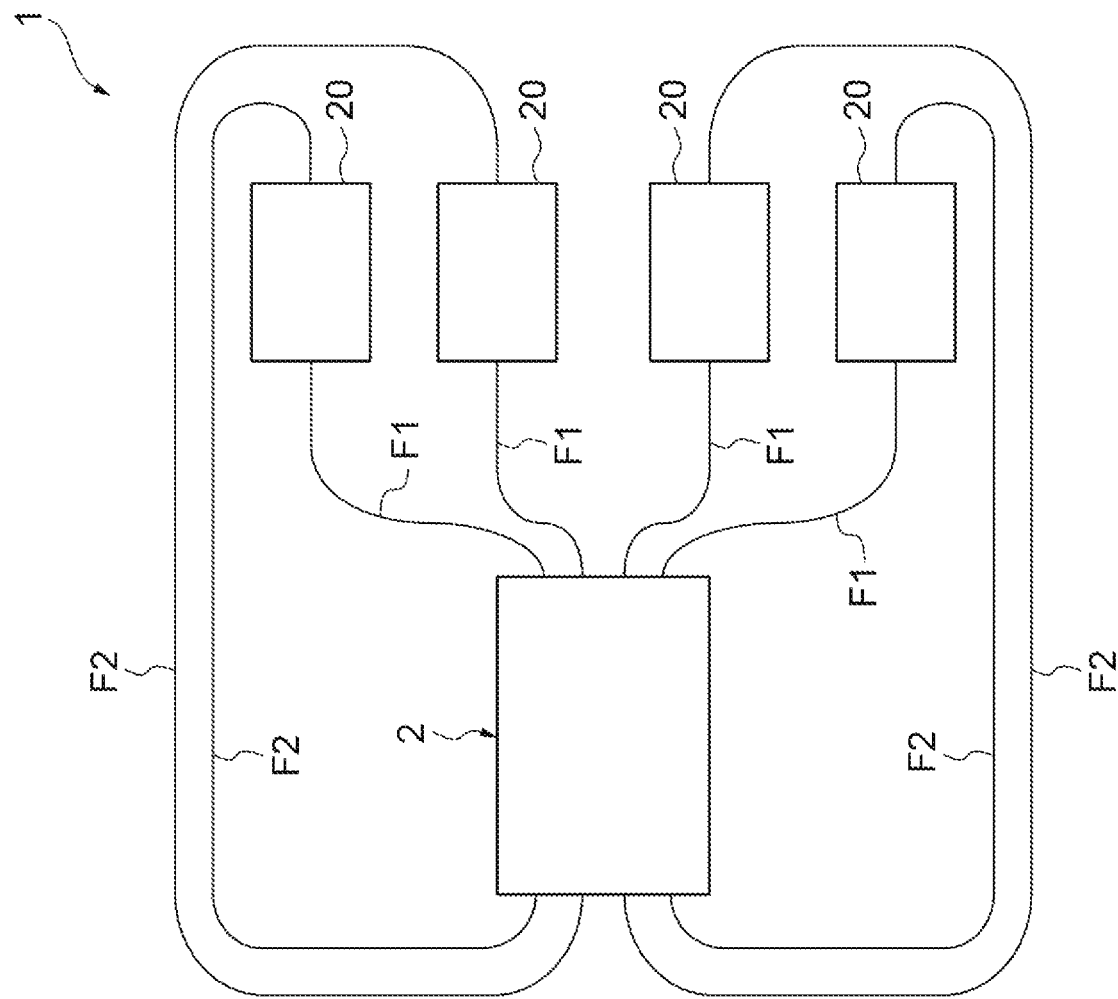
FIG. 1 is a diagram illustrating an optical network system according to one embodiment and N information processing terminals connected to the optical network system.

Problem to be Solved by the Present Disclosure

In an optical network system, a plurality of terminals may mutually perform optical communication. In such a case, for example, providing one-to-one optical transmission lines between the terminals gives rise to a problem that the number of optical transmission lines becomes enormous in accordance with an increase in the number of terminals and its configuration becomes complicated. Consequently, an object of the present disclosure is to simplify the configuration of an optical network system in which a plurality of terminals mutually perform optical communication, and to provide an autonomous driving system including the simplified optical network system.

Effect of the Present Disclosure

According to the present disclosure, it is possible to simplify the configuration of an optical network system in which a plurality of terminals mutually perform optical communication. According to the present disclosure, it is possible to provide an autonomous driving system including the simplified optical network system.

DESCRIPTION OF EMBODIMENT OF THE PRESENT DISCLOSURE

First, embodiments of the present disclosure will be listed and described. An optical network system according to one embodiment includes N (N is an integer equal to or greater than 2) information processing terminals each including an optical transmitter unit and an optical receiver unit, N first optical fibers, N first optical transmission lines, N second optical fibers, N second optical transmission lines, an optical coupling unit, and an optical branching unit. The N first optical fibers extend from the respective optical transmitter units of the N information processing terminals. The N first optical transmission lines are connected to the respective first optical fibers at one ends. The N second optical fibers extend from the respective optical receiver units of the N information processing terminals. The N second optical transmission lines are connected to the respective second optical fibers at one ends. The optical coupling unit couples another ends of the N first optical transmission lines to one end of a third optical transmission line. The optical branching unit couples another end of the third optical transmission line to another ends of the N second optical transmission lines.

In this optical network system, when an optical signal is transmitted from an optical transmitter unit of a certain information processing terminal, the optical signal propagates through one first optical transmission line and reaches the optical coupling unit. The optical signal then propagates through the third optical transmission line through the optical coupling unit, and then is distributed to the N second optical transmission lines by the optical branching unit. The optical signal having propagated through each second optical transmission line reaches the N information processing terminals through the N second optical fibers and is received in the optical receiver unit of each information processing terminal Such a flow of the optical signal is the same as in a case where an optical signal is transmitted from an optical transmitter unit of another information processing terminal.

In this way, in the above-described optical network system, the optical signal transmitted from each information processing terminal is aggregated in the third optical transmission line and then sent out to all the information processing terminals. Therefore, the configuration of the optical network system can be simplified compared with, for example, a case where a one-to-one optical transmission line is provided between the information processing terminals.

The above-described optical network system may further include an optical amplifier provided in the middle of the third optical transmission line. For example, in a configuration in which a one-to-one optical transmission line is provided between the information processing terminals, if an optical amplifier is provided in the middle of the optical transmission line, an optical amplifier is provided in each of a large number of optical transmission lines, which results in an increase in costs and further complication of the system. On the other hand, according to the above-described optical network system, the optical signal transmitted from each information processing terminal is temporarily aggregated in the third optical transmission line, and thus the number of optical amplifiers can be significantly reduced by providing an optical amplifier on the third optical transmission line. Therefore, it is possible to suppress an increase in costs and the complication of the system due to the optical amplifiers being provided. In this case, the optical amplifier may be a rare-earth-doped fiber amplifier or a semiconductor optical amplifier.

The above-described optical network system may further include N optical signal detection units, a communication control unit, and an avoidance signal sending unit. Each of the N optical signal detection units detects an optical signal propagating through each of the first optical transmission lines. The communication control unit generates a collision avoidance signal for avoiding a collision between optical signals on the basis of detection results of the N optical signal detection units. The avoidance signal sending unit converts the collision avoidance signal into light and sends out this light from the third optical transmission line or the N second optical transmission lines to the N information processing terminals. When optical signals are sent out simultaneously from two or more information processing terminals, these optical signals collide with each other in the third optical transmission line and become unreceivable signals. As in such an optical network system, the communication control unit sends out a signal for avoiding a collision between optical signals to each information processing terminal, and thus it is possible to adjust sending timings of the optical signals between the information processing terminals, and to avoid a collision between the optical signals.

In the above-described optical network system, a scheme of avoiding the collision between optical signals may be dynamic bandwidth allocation, CSMA/CA, CSMA/CD, or a token ring. Using any of these, it is possible to adjust sending timings of the optical signals between the information processing terminals, and to reduce a collision between the optical signals.

In the above-described optical network system, the N first optical transmission lines and the N second optical transmission lines may comprise single-mode optical fibers.

In the above-described optical network system, N is equal to or greater than 4, and the optical coupling unit may be formed by combining a plurality of optical couplers having 2 inputs and 1 output.

In the above-described optical network system, N is equal to or greater than 4, and the optical branching unit may be formed by combining a plurality of optical couplers having 1 input and 2 outputs.

An autonomous driving system according to one embodiment includes any of the optical network systems. The N information processing terminals are installed on a roadside at intervals from each other. The N information processing terminals transmit and receive information for autonomous driving to and from a traveling automobile, and mutually provide and share position information relating to the automobile. According to this autonomous driving system, all the information processing terminals can reliably know of the presence of the automobile.

Details of Embodiment of the Present Disclosure

Specific examples of an optical network system and an autonomous driving system of the present disclosure will be described below with reference to the drawings. The present invention is not limited to these examples. The present invention is indicated by the claims, and it is intended to include all changes within the scope and meaning equivalent to the claims. In the following description, the same components are denoted by the same reference numerals in the description of the drawings, and repeated description thereof will be omitted.

FIG. 1 is a diagram illustrating an optical network system 1 according an embodiment of the present disclosure. As shown in the drawing, the optical network system 1 includes an optical network unit 2 and N information processing terminals 20 connected to the optical network unit 2. N is an integer equal to or greater than 2, and a case where N is 4 is illustrated in the drawing. Specifically, an optical transmitter unit of each information processing terminal 20 and the optical network unit 2 are optically coupled to each other through an optical fiber F1. The optical fiber F1 is an example of a first optical fiber in the present disclosure. In addition, an optical receiver unit of each information processing terminal 20 and the optical network unit 2 are optically coupled to each other through an optical fiber F2. The optical fiber F2 is an example of a second optical fiber in the present disclosure. The optical network unit 2 assists with mutual optical communication between the N information processing terminals 20.

Figure 2:
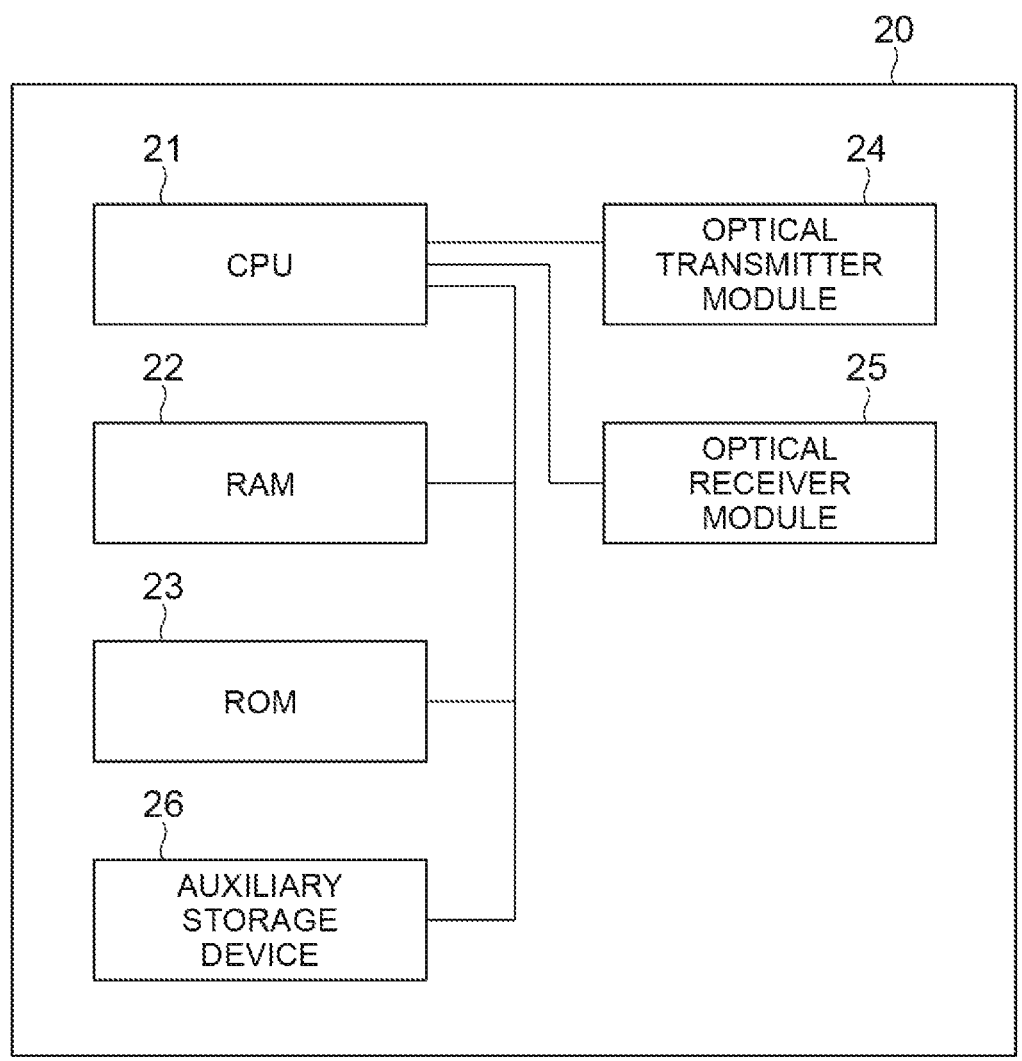
FIG. 2 is a block diagram illustrating a hardware configuration example of each information processing terminal.

FIG. 2 is a block diagram illustrating a hardware configuration example of each information processing terminal 20. As shown in FIG. 2, the information processing terminal 20 is configured to include a computer provided with hardware such as a central processing unit (CPU) 21, a volatile memory (random access memory (RANI)) 22, a non-volatile memory (read only memory (ROM)) 23, an optical transmitter module 24, an optical receiver module 25, and an auxiliary storage device 26. The information processing terminal 20 realizes a predetermined function by these components operating using a program or the like. The optical transmitter module 24 corresponds to the above-described optical transmitter unit, and the optical receiver module 25 corresponds to the above-described optical receiver unit.

Figure 3:
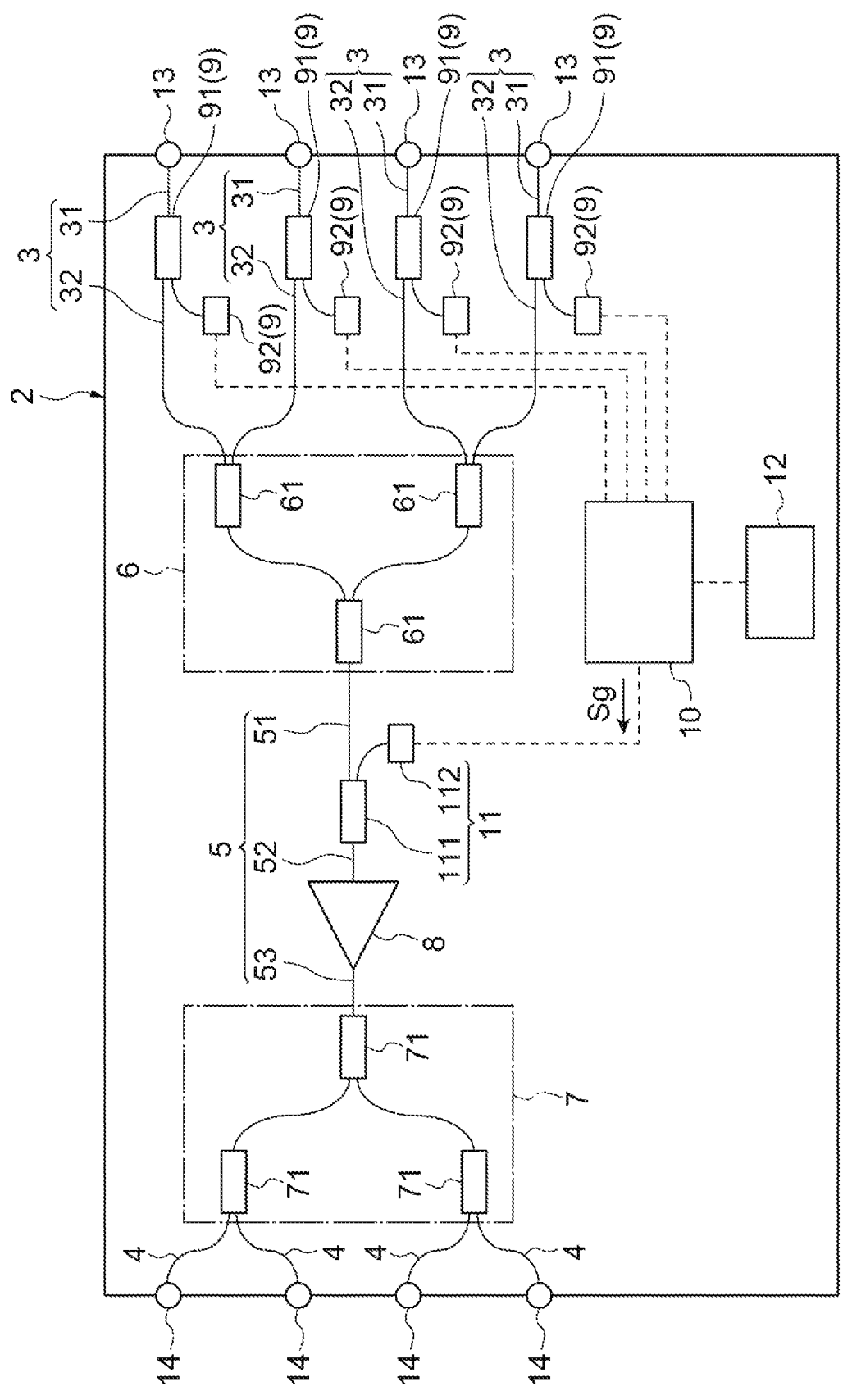
FIG. 3 is a diagram illustrating an internal configuration of the optical network system.

FIG. 3 is a diagram illustrating an internal configuration of the optical network unit 2. As shown in FIG. 3, the optical network unit 2 includes N optical transmission lines 3, N optical transmission lines 4, one optical transmission line 5, an optical coupling unit 6, an optical branching unit 7, an optical amplifier 8, N optical signal detection units 9, a communication control unit 10, an avoidance signal sending unit 11, a communication mechanism 12, N optical input ports 13, and N optical output ports 14. The optical transmission line 3 is an example of a first optical transmission line in the present disclosure. The optical transmission line 4 is an example of a second optical transmission line in the present disclosure. The optical transmission line 5 is an example of a third optical transmission line in the present disclosure.

One end of each of the N optical transmission lines 3 is connected to the optical fiber F1 (see FIG. 1) extending from an optical transmitter unit of a corresponding information processing terminal 20 through a corresponding optical input port 13. One end of each of the N optical transmission lines 4 is connected to the optical fiber F2 (see FIG. 1) extending from an optical receiver unit of a corresponding information processing terminal 20 through a corresponding optical output port 14. The optical transmission lines 3 and 4 can comprise, for example, single-mode optical fibers (SMF).

The optical coupling unit 6 couples another ends of the N optical transmission lines 3 to one end of the optical transmission line 5. The optical coupling unit 6 is, for example, an optical coupler of N inputs and 1 output. In a case where N is equal to or greater than 4, the optical coupling unit 6 can be formed by combining a plurality of optical couplers having 2 inputs and 1 output. In the shown example, that is, in a case where N is 4, the optical coupling unit 6 is configured to include three optical couplers 61 having 2 inputs and 1 output. Specifically, another ends of two optical transmission lines 3 are coupled to two input ends of one optical coupler 61, and another ends of the remaining two optical transmission lines 3 are coupled to two input ends of another optical coupler 61. The output ends of these optical couplers 61 are coupled to two input ends of another optical coupler 61 through an optical fiber. The output end of another optical coupler 61 is coupled to the one end of the optical transmission line 5. The optical transmission line 5 can comprise, for example, an SMF.

The optical branching unit 7 couples another end of the optical transmission line 5 to another ends of the N optical transmission lines 4. The optical branching unit 7 is, for example, an optical coupler of 1 input and N outputs. In a case where N is equal to or greater than 4, the optical branching unit 7 can be formed by combining a plurality of optical couplers having 1 input and 2 outputs. In the shown example, that is, in a case where N is 4, the optical branching unit 7 is configured to include three optical couplers 71 having 1 input and 2 outputs. Specifically, the another end of the optical transmission line 5 is coupled to an input end of one optical coupler 71. Two output ends of the optical coupler 71 are coupled to respective input ends of the other two optical couplers 71 through optical fibers. The two output ends of one optical coupler 71 of the other two optical couplers 71 are coupled to the respective other ends of the two optical transmission lines 4. The two output ends of the other optical coupler 71 are coupled to the respective other ends of the remaining two optical transmission lines 4. In the optical coupling unit 6, it is preferable that the coupling ratios of the N optical transmission lines 3 are substantially the same as each other. In the optical branching unit 7, it is preferable that the branching ratios of the N optical transmission lines 4 are substantially the same as each other.

The optical amplifier 8 is provided in the middle of the optical transmission line 5. That is, the optical transmission line 5 has three portions 51, 52, and 53, the input end of the optical amplifier 8 is optically coupled to the optical coupling unit 6 through the portions 51 and 52, and the output end of the optical amplifier 8 is optically coupled to the optical branching unit 7 through the portion 53. The optical amplifier 8 amplifies an optical signal propagating through the optical transmission line 5 as an optical signal without converting the optical signal into an electrical signal. Examples of such an optical amplifier 8 include an erbium doped fiber amplifier (EDFA), a praseodymium doped fiber amplifier (PDFA), and a thulium doped fiber amplifier (TDFA), which are rare-earth-doped fiber amplifiers, a semiconductor optical amplifier (SOA), and the like.

Here, the movement of optical signals in the N optical transmission lines 3, the N optical transmission lines 4, the optical transmission line 5, the optical coupling unit 6, the optical branching unit 7, and the optical amplifier 8 will be described. When an optical signal is transmitted from the optical transmitter module 24 which is an optical transmitter unit of a certain information processing terminal 20, the optical signal propagates through one optical transmission line 3 and reaches the optical coupling unit 6. The optical signal passes through the optical coupling unit 6, and is amplified and enhanced by the optical amplifier 8 while propagating through the optical transmission line 5. Thereafter, this optical signal is distributed to the N optical transmission lines 4 by the optical branching unit 7. That is, the same optical signal propagates through the N optical transmission lines 4. The optical signal having propagated through each optical transmission line 4 reaches all the information processing terminals 20 through the optical fiber F2, and is received in the optical receiver module 25 which is an optical receiver unit of each information processing terminal 20. Such a flow of the optical signal is the same as when the optical signal is transmitted from an optical transmitter unit of another information processing terminal 20. Meanwhile, the optical signal received in the information processing terminal 20 which is a sending source of the optical signal is ignored by a CPU 21 inside the information processing terminal 20. In this way, the optical network unit 2 assists with mutual optical communication in the N information processing terminals 20.

The configuration of the optical network unit 2 will be further described. The N optical signal detection units 9 detect optical signals propagating through the corresponding optical transmission lines 3. Each optical signal detection unit 9 includes an optical branching unit 91 and a light receiving element 92. The optical branching unit 91 is, for example, an optical coupler having 1 input and 2 outputs, and is provided in the middle of the optical transmission line 3. The optical transmission line 3 has two portions 31 and 32. The input end of the optical branching unit 91 is optically coupled to the optical input port 13 through the portion 31. One output end of the optical branching unit 91 is optically coupled to the optical coupling unit 6 through the portion 32. The light receiving element 92 is, for example, a photodiode. The light receiving element 92 is optically coupled to the other output end of the optical branching unit 91 through an optical fiber. The light receiving element 92 receives a part of the optical signal propagating through the optical transmission line 3 from the optical branching unit 91, and generates an electrical signal according to the light intensity of the part of the optical signal.

The communication control unit 10 generates a collision avoidance signal Sg on the basis of detection results of the N optical signal detection units 9. The collision avoidance signal Sg is a signal for avoiding a collision between optical signals. In an example, when the communication control unit 10 confirms sending out of an optical signal from a certain optical signal detection unit 9, the communication control unit transmits the collision avoidance signal Sg for restricting the sending of the optical signal to all the other optical signal detection units 9 until the sending of the optical signal is completed.

The avoidance signal sending unit 11 includes an optical coupling unit 111 and a light-emitting element 112. The light-emitting element 112 is electrically connected to the communication control unit 10, and inputs the collision avoidance signal Sg generated in the communication control unit 10. The light-emitting element 112 converts the collision avoidance signal Sg into an optical signal and outputs the converted signal. The light-emitting element 112 is, for example, a laser diode. The optical coupling unit 111 is, for example, an optical coupler having 2 inputs and 1 output. The optical coupling unit 111 is provided in the middle of the optical transmission line 5. In an example, the optical coupling unit 111 is provided between the optical coupling unit 6 and the optical amplifier 8.

That is, one input end of the optical coupling unit 111 is optically coupled to the output end of the optical coupling unit 6 through the portion 51 of the optical transmission line 5. The output end of the optical coupling unit 111 is optically coupled to the optical amplifier 8 through the portion 52 of the optical transmission line 5. The other input end of the optical coupling unit 111 is optically coupled to the light-emitting element 112 through an optical fiber. The collision avoidance signal Sg which is output from the light-emitting element 112 as an optical signal reaches the optical amplifier 8 through the optical coupling unit 111. Thereafter, the collision avoidance signal Sg which is output as an optical signal is distributed to the N optical transmission lines 4 in the optical branching unit 7 and sent out to the N information processing terminals 20. This collision avoidance signal Sg is also sent to the information processing terminal 20 that outputs an optical signal, but the collision avoidance signal Sg is ignored in the information processing terminal 20.

Meanwhile, the optical coupling unit 111 may be provided in the middle of the optical transmission line 5 and between the optical amplifier 8 and the optical branching unit 7. In this case, one input end of the optical coupling unit 111 is optically coupled to the output end of the optical amplifier 8 through a portion of the optical transmission line 5, and the output end of the optical coupling unit 111 is optically coupled to the optical branching unit 7 through another portion of the optical transmission line 5. The other input end of the optical coupling unit 111 is optically coupled to the light-emitting element 112 through an optical fiber.

The communication mechanism 12 is a portion that communicates with an upper-level device which is not shown. The communication mechanism 12 is electrically connected to the communication control unit 10, and reports the communication status, communication content, and the like of the optical network system 1 to the upper-level device.

Examples of schemes of avoiding a collision between optical signals other than above include dynamic bandwidth allocation (DBA), carrier sense multiple access with collision detection (CSMA/CD), carrier sense multiple access with collision avoidances (CSMA/CA), and a token ring.

DBA is a scheme of dynamically allocating a transmission band, that is, a channel of an optical signal in accordance with the amount of traffic. In this scheme, instead of allocating an individually independent transmission band to each of the N information processing terminals 20, the transmission band is allocated only to an information processing terminal 20 that transmits an optical signal, and the allocation of the transmission band is flexibly changed every time the information processing terminal 20 that transmits an optical signal is changed. In this scheme, the communication control unit 10 allocates the transmission band. The communication control unit 10 transmits a signal indicating a transmission band allocated to each information processing terminal 20 to each information processing terminal 20 instead of the collision avoidance signal Sg.

CSMA/CD is a communication scheme in which, when a plurality of instruments share one communication line, a right to use the line can be adjusted even in a case where there is no instrument that performs central monitoring and control. CSMA/CD is adopted in Ethernet (registered trademark) or the like. Specifically, an information processing terminal 20 that desires to transmit an optical signal monitors the status of an optical signal flowing through the optical network unit 2, confirms that none of the information processing terminals 20 is transmitting the optical signal, and then starts to transmit it. At this time, in a case where another information processing terminal 20 happens to start the transmission simultaneously, both of them interrupt the communication in order to prevent data from being corrupted due to a collide between optical signals. Thereafter, both information processing terminals 20 randomly wait for several milliseconds and then resume the transmission. Since the probability of the randomly determined waiting time being exactly the same is low, one information processing terminal 20 having determined a short waiting time performs the transmission in advance, and the other information processing terminal 20 can resume the transmission after the one information processing terminal 20 completes the transmission. In this scheme, the communication control unit 10 and the avoidance signal sending unit 11 are not required.

In CSMA/CA, each information processing terminal 20 continuously monitors the shared transmission band, and starts to transmit an optical signal when it is confirmed that the transmission band is free for a certain period of time or longer. The waiting time of each information processing terminal 20 is determined by each information processing terminal 20 adding back-off to the common minimum waiting time. The back-off is a random time which is independently determined for each information processing terminal 20. This prevents the transmission from being performed all at once after a certain period of time has elapsed since the immediately preceding communication was completed.

Whether an optical signal is correctly transmitted in actuality is determined by whether an ACK (Acknowledge) signal from an information processing terminal 20 on the receiver side reaches an information processing terminal 20 on the transmission side. In a case where there is no ACK signal from the information processing terminal 20 on the receiver side, it is considered that there is a communication failure, and the information processing terminal 20 on the transmission side retransmits the optical signal. In this scheme, the communication control unit 10 and the avoidance signal sending unit 11 are also not required.

In the token ring, the N information processing terminals 20 that participate in a network are connected to each other in an annular shape so as to logically draw one ring. However, physically, a star-type connection mode in which the N information processing terminals 20 are connected to one line concentrator, that is, the optical network unit 2, is formed. In order to prevent a plurality of information processing terminals 20 from simultaneously sending out optical signals and the optical signals from colliding with each other, a scheme called token passing is used. That is, a signal called a token indicating a right to transmit data circulates on a ring at a high speed, and an information processing terminal 20 that desires to transmit data sends out the data and the token together to the network when a free token arrives at itself. A token to which this data is attached is called a busy token, and follows the ring to an information processing terminal 20 which is a destination. The information processing terminal 20 which is a destination receives the data, and then returns the received busy token to an information processing terminal 20 which is a transmission source along the ring. The information processing terminal 20 which is a transmission source converts the returned busy token into a free token to return it to the network, so that another information processing terminal 20 can transmit the data. In this scheme, the communication control unit 10 and the avoidance signal sending unit 11 are also not required.

Effects obtained by the optical network system 1 according to the present embodiment described above will be described. In the optical network system 1 of the present embodiment, the optical signal transmitted from each information processing terminal 20 is aggregated in the optical transmission line 5 and then sent out to all the information processing terminals 20. Therefore, the configuration of the optical network system can be simplified compared with, for example, a case where a one-to-one optical transmission line is provided between the information processing terminals 20.

As in the present embodiment, the optical amplifier 8 may be provided in the middle of the optical transmission line 5. For example, in a configuration in which a one-to-one optical transmission line is provided between the information processing terminals 20, if an optical amplifier is provided in the middle of the optical transmission line, an optical amplifier is provided in each of a large number of optical transmission lines, which results in an increase in costs and further complication of the system. On the other hand, according to the optical network system 1 of the present embodiment, the optical signal transmitted from each information processing terminal 20 is temporarily aggregated in the optical transmission line 5, and thus the number of optical amplifiers 8 can be significantly reduced by providing the optical amplifier 8 on the optical transmission line 5. Therefore, it is possible to suppress an increase in costs and the complication of the system due to the optical amplifiers being provided.

As in the present embodiment, the optical network system 1 may include the N optical signal detection units 9, the communication control unit 10, and the avoidance signal sending unit 11. When optical signals are sent out simultaneously from two or more information processing terminals 20, these optical signals collide with each other in the optical transmission line 5 and become unreceivable signals. As in this optical network system 1, the communication control unit 10 sends out the collision avoidance signal Sg to each information processing terminal 20, and thus it is possible to adjust sending timings of the optical signals between the information processing terminals 20, and to avoid a collision between the optical signals.

Alternatively, a scheme of avoiding the collision between optical signals may be DBA, CSMA/CA, CSMA/CD, or a token ring. Using any of these, it is possible to adjust sending timings of the optical signal between the information processing terminals 20, and to reduce a collision between the optical signals.

FIG. 4 is a diagram schematically illustrating a configuration of an autonomous driving system 100 as an application example of the present embodiment. This autonomous driving system 100 includes N information processing terminals 20 and the optical network unit 2 connected to the N information processing terminals 20. The drawing illustrates a case where the number N is 3. Each information processing terminals 20 is installed on a roadside at a substantially constant interval, for example, an interval of 100 meters. Each information processing terminal 20 transmits and receives various types of information for an autonomous driving to and from a traveling automobile 102. Such an automobile 102 is called a connected car.

In that case, depending on a positional relationship between the information processing terminal 20 and the automobile 102, the information processing terminal 20 may not be able to detect the presence of the automobile 102 due to an obstacle being present therebetween or the like. Even in such a case, the N information processing terminals 20 mutually provides and shares position information relating to the automobile 102 or the like, and thus all the information processing terminals 20 can reliably know of the presence of the automobile 102. For example, the optical network system 1 is used for such information sharing.

In a case where a network system, a wireless system, or the like using an electrical signal is used, there may be concern of communication between information processing terminals being interrupted due to lightning, noise, or the like, which is not preferable for the automobile 102 during autonomous driving. According to the autonomous driving system 100 of the present embodiment, it is possible to reduce the concern of communication being interrupted between the information processing terminals by using the above-described the optical network system 1.

The optical network system and the autonomous driving system according to the present disclosure, are not limited to the above-described embodiment, and can be modified in various other ways. For example, the optical network system 1 of the embodiment includes the optical amplifier 8. However, in a case where output power of an optical signal from each information processing terminal 20 is sufficient large and each information processing terminal 20 can receive the optical signal even when optical losses in the optical coupling unit 6, the optical branching unit 7, and the like are taken into consideration, the optical amplifier 8 may be omitted. In the embodiment, although the optical coupling unit 111 of the avoidance signal sending unit 11 is provided on the optical transmission line 5, N optical coupling units 111 may be configured to be provided in each of the N optical transmission lines 4.

REFERENCE SIGNS LIST

1 Optical network system
2 Optical network unit
3 First optical transmission line
4 Second optical transmission line
5 Third optical transmission line
6 Optical coupling unit
7 Optical branching unit
8 Optical amplifier
9 Optical signal detection unit
10 Communication control unit
11 Avoidance signal sending unit
12 Communication mechanism
13 Optical input port
14 Optical output port
20 Information processing terminal
21 CPU
22 RANI
23 ROM
24 Optical transmitter module
25 Optical receiver module
26 Auxiliary storage device
31, 32, 51, 52, 53 Portion
61, 71 Optical coupler
91 Optical branching unit
92 Light receiving element
100 Autonomous driving system
102 Automobile
111 Optical coupling unit
112 Light-emitting element
F1, F2 Optical fiber
Sg Collision avoidance signal

The invention claimed is:

1. An optical network system comprising:
N (N is an integer equal to or greater than 2) information processing terminals each including an optical transmitter unit and an optical receiver unit;
N first optical fibers extending from the respective optical transmitter units of the N information processing terminals;
N first optical transmission lines connected to the respective first optical fibers at one ends;
N second optical fibers extending from the respective optical receiver units of the N information processing terminals;
N second optical transmission lines connected to the respective second optical fibers at one ends;
an optical coupling unit configured to couple another ends of the N first optical transmission lines to one end of a third optical transmission line; and
an optical branching unit configured to couple another end of the third optical transmission line to another ends of the N second optical transmission lines.

2. The optical network system according to claim 1, further comprising an optical amplifier provided in the middle of the third optical transmission line.

3. The optical network system according to claim 2, wherein the optical amplifier is a rare-earth-doped fiber amplifier or a semiconductor optical amplifier.

4. The optical network system according to claim 1, further comprising:
N optical signal detection units, each of the N optical signal detection units being configured to detect an optical signal propagating through each of the first optical transmission lines;
a communication control unit configured to generate a collision avoidance signal for avoiding a collision between optical signals on the basis of detection results of the N optical signal detection units; and
an avoidance signal sending unit configured to convert the collision avoidance signal into light and send out the converted signal from the third optical transmission line or the N second optical transmission lines to the N information processing terminals.

5. The optical network system according to claim 1, wherein a scheme of avoiding the collision between optical signals is dynamic bandwidth allocation, CSMA/CA, CSMA/CD, or a token ring.

6. The optical network system according to claim 1, wherein the N first optical transmission lines and the N second optical transmission lines comprise single-mode optical fibers.

7. The optical network system according to claim 1, wherein N is equal to or greater than 4, and
the optical coupling unit is formed by combining a plurality of optical couplers having 2 inputs and 1 output.

8. The optical network system according to claim 1, wherein N is equal to or greater than 4, and
the optical branching unit is formed by combining a plurality of optical couplers having 1 input and 2 outputs.

9. An autonomous driving system comprising the optical network system according to claim 1,
wherein the N information processing terminals are installed on a roadside at intervals from each other, transmit and receive information for an autonomous driving to and from a traveling automobile, and mutually provide and share position information relating to the automobile.

10. The optical network system according to claim 2, further comprising:
N optical signal detection units, each of the N optical signal detection units being configured to detect an optical signal propagating through each of the first optical transmission lines;
a communication control unit configured to generate a collision avoidance signal for avoiding a collision between optical signals on the basis of detection results of the N optical signal detection units; and
an avoidance signal sending unit configured to convert the collision avoidance signal into light and send out the converted signal from the third optical transmission line or the N second optical transmission lines to the N information processing terminals.

11. The optical network system according to claim 3, further comprising:
N optical signal detection units, each of the N optical signal detection units being configured to detect an optical signal propagating through each of the first optical transmission lines;
a communication control unit configured to generate a collision avoidance signal for avoiding a collision between optical signals on the basis of detection results of the N optical signal detection units; and
an avoidance signal sending unit configured to convert the collision avoidance signal into light and send out the converted signal from the third optical transmission line or the N second optical transmission lines to the N information processing terminals.

12. The optical network system according to claim 2, wherein a scheme of avoiding the collision between optical signals is dynamic bandwidth allocation, CSMA/CA, CSMA/CD, or a token ring.

13. The optical network system according to claim 3, wherein a scheme of avoiding the collision between optical signals is dynamic bandwidth allocation, CSMA/CA, CSMA/CD, or a token ring.

14. The optical network system according to claim 2, wherein N is equal to or greater than 4, and
the optical coupling unit is formed by combining a plurality of optical couplers having 2 inputs and 1 output.

15. The optical network system according to claim 3, wherein N is equal to or greater than 4, and
the optical coupling unit is formed by combining a plurality of optical couplers having 2 inputs and 1 output.

16. The optical network system according to claim 4, wherein N is equal to or greater than 4, and
the optical coupling unit is formed by combining a plurality of optical couplers having 2 inputs and 1 output.

17. The optical network system according to claim 5, wherein N is equal to or greater than 4, and
the optical coupling unit is formed by combining a plurality of optical couplers having 2 inputs and 1 output.

18. The optical network system according to claim 2, wherein N is equal to or greater than 4, and
the optical branching unit is formed by combining a plurality of optical couplers having 1 input and 2 outputs.

19. The optical network system according to claim 3, wherein N is equal to or greater than 4, and
the optical branching unit is formed by combining a plurality of optical couplers having 1 input and 2 outputs.

20. The optical network system according to claim 4, wherein N is equal to or greater than 4, and
the optical branching unit is formed by combining a plurality of optical couplers having 1 input and 2 outputs.

* * * * *